May 10, 1938.  V. PAGE  2,117,116
CHANGE-SPEED GEARING FOR CHAIN-DRIVEN VEHICLES
Original Filed June 18, 1936

INVENTOR
Valentine Page
BY
Mawhinney & Mawhinney
ATTORNEYS.

Patented May 10, 1938

2,117,116

UNITED STATES PATENT OFFICE 2,117,116

CHANGE-SPEED GEARING FOR CHAIN-DRIVEN VEHICLES

Valentine Page, Birmingham, England, assignor to Tri-Velox Gears Limited, Coventry, England Application June 18, 1936, Serial No. 85,992. Renewed February 8, 1938. In Great Britain June 18, 1935

5 Claims. (Cl. 74—217)

This invention relates to change-speed gearing, for bicycles, tandems, tricycles and other chain-driven vehicles, of the kind having an assembly of different-sized sprocket wheels slidably mounted upon a rotatable hub, the sliding motion of the assembly, which preferably incorporates a free-wheel, being effected from the interior of the hub.

Different speeds will be obtained according to which of the sprockets is engaged by the driving chain, and the sprocket assembly may be axially positioned to bring the sprocket which is engaged by the chain in line with the driving sprocket, provision being made for tensioning the chain as desirable. One example of such gearing is shown in the specification of British Patent No. 382,104.

The main object of the present invention is to provide an improved construction by which the assembly and detachment of the parts when necessary can be simply carried out. A further object is to provide an improved and robust control for the sprocket assembly.

The invention consists in arranging for the sliding motion of the assembly to be effected by means of a sleeve which is slidably guided by the internal periphery of the hub.

Preferably use is made of a key slidably mounted in a longitudinal slot of the hub and detachably engaging the assembly and a sleeve, the key being releasable by means engaging the sleeve. In a preferred arrangement the key enters a notch at the end of the sleeve and is clamped thereto by a detachable plate.

Preferably, too, the sleeve has an inwardly-extending part engaged by an operating collar slidably mounted upon a spindle upon which the hub is rotatable. Such collar may be spring-pressed in one direction, preferably by a spring mounted externally of the spindle, and positively pulled in the other direction by a flexible means extending interiorly of the spindle and connected to a cross-piece working in a slot in the spindle.

In the accompanying drawing:—

Figure 1:
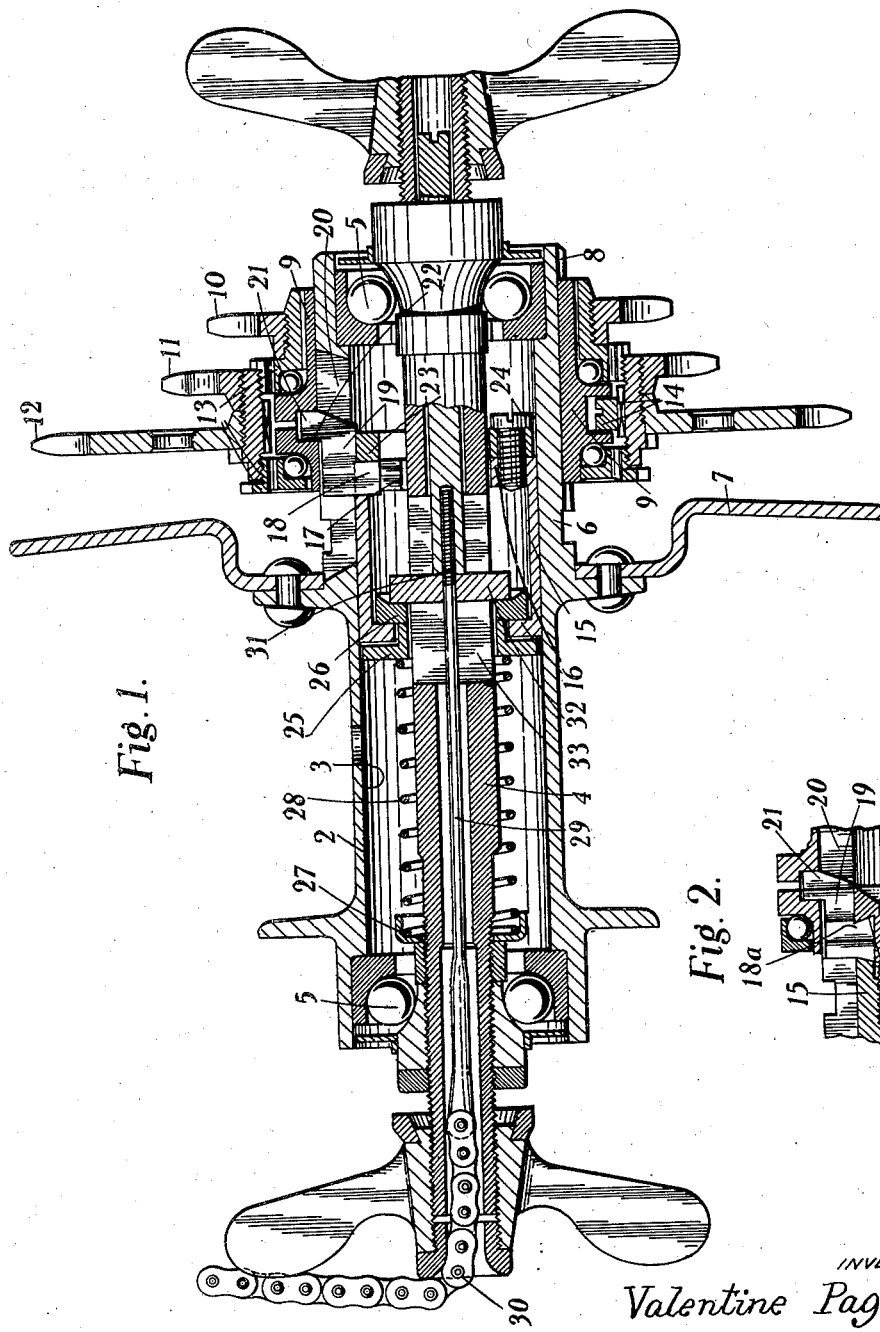
Figure 2:
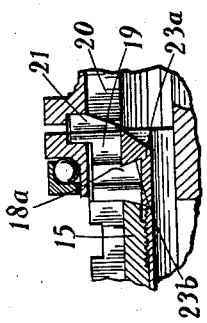

Figure 1 is an enlarged central vertical section through a change-speed gear, suitable for a bicycle or tandem, according to the invention; and Figure 2 is a similar but fragmentary view showing a modification.

In the drawing, the hub 2 has a through bore 3 through which extends a stationary spindle 4, supporting the hub through ball bearings 5, 5. The end 6 of the hub projects materially beyond the adjacent spoke flange 7 and is splined externally at 8. Slidably mounted on the splines is a base 9 of the sprocket assembly which comprises three different-sized sprockets 10, 11, 12, each of which is screw-threaded on to an intermediate built-up member 13. The sprockets are therefore individually removable.

In the hub is a sleeve 15 of a diameter such that it forms a good sliding fit in the inner periphery 3 and each end of this sleeve has a radially inward flange 16. The end of the sleeve adjacent the sprocket assembly is notched at 17 to receive an inward projection 18 on a key 19 slidably mounted in a slot 20 in the projecting hub part 6. An outward radial projection 21 on the other end of the key engages a notch 22 in the base 9 of the sprocket assembly. The key is detachably secured to the sleeve 15 by means of an end disc 23 which clamps it in the notch 17 when screws 24 are tightened. Alternatively, as shown by Figure 2, use may be made of a screwed sleeve 23a having an undercut flange 23b conforming to the dovetail 18a of the key. In this way the sleeve 15 and sprocket assembly are axially and rotatably movable in unison.

The axial movement is effected in the following manner. On the spindle 4 are freely mounted two washers 25, 26 which lie one on each side of the inward radial flange 16 at the inner end of the sleeve 15, slight endwise clearance being provided for as shown. These washers together form an operating collar and between the washer 25 and a cup 27 on the spindle is a compression spring 28 which urges the sleeve 15 to the right. Within the spindle is an operating rod 29 having a flexible control means 30 attached thereto at its outer end. Its inner end 31 is screwed into a block abutting one face of a crosspiece 32. The crosspiece 32 extends through a longitudinal slot 33 in the spindle and co-acts with the washer 26 on its other face. In this way, when the control member is pulled the sleeve and sprocket assembly are positively moved axially to the left by means of the cross-piece 32 whilst, when the control member is released, the spring 28 acts through the washer 25 and sleeve projection 16 to move the sleeve and sprocket assembly to the right. The amount of axial movement is, of course, controlled.

The shifting of the chain from one sprocket to another is effected in the manner described in the specification aforesaid.

By means of the invention a very robust construction of change-speed gearing can be produced and the assembling and dismantling of the various parts is simple. As the whole of the shifting mechanism for the sprocket assembly is within the hub it is protected from damage through blows or other causes and can be effectively lubricated. Compared with known arrangements the present invention enables a reduction in weight to be effected without sacrificing strength. Moreover, by having independent sprockets mounted as described, various different gear ratios may be easily and inexpensively obtained and this without interfering with the free-wheel mechanism.

What I claim as my invention and desire to secure by Letters Patent of the United States is:—

1. In a change-speed gearing of the character described, a rotatable hub, an assembly of different-sized sprocket wheels slidably mounted thereon and in driving connection therewith, a key slidable in a longitudinal slot of said hub, a sleeve slidably engaging the internal periphery of said hub, said key detachably engaging said sprocket assembly and also entering a notch at the end of said sleeve, and a detachable means independent of said key for clamping said key in said notch.

2. In a change-speed gearing of the character specified, a stationary spindle, a hub journalled thereon, an assembly of different-sized sprocket wheels slidably keyed on said hub, a sleeve slidably guided by the interior of said hub, a key slidable in a longitudinal slot of said hub, said key interconnecting said sprocket assembly and said sleeve for sliding movement in unison, an operating collar slidably mounted upon said spindle, and means interconnecting said collar and sleeve for sliding movement in unison.

3. In a change-speed gearing of the character specified, a stationary spindle, a hub journalled thereon, an assembly of different-sized sprocket wheels slidably guided on said hub in driving connection therewith, a sleeve slidably guided by the interior of said hub, a key slidable in a longitudinal slot of said hub and interconnecting said sprocket assembly and sleeve for sliding movement in unison, an operating collar slidably mounted upon said spindle, means interconnecting said collar and said sleeve for sliding movement in unison, means urging said collar in one direction, and means for positively moving said collar in the other direction.

4. In a change-speed gearing of the character specified, a stationary hollow spindle, a hub journalled thereon, an assembly of different-sized sprocket wheels slidably splined on said hub, a sleeve slidably mounted in the interior of said hub, a key operating in a longitudinal slot of said hub and interconnecting said sprocket assembly and sleeve, an operating collar mounted upon said spindle, means interconnecting said collar and said sleeve, means urging said collar in one direction, and means for positively moving said collar in the other direction, said latter means extending interiorly of said spindle and connected to a cross-piece, said cross-piece working in a slot in said spindle.

5. In a change-speed gearing of the character described, a stationary hollow spindle, a hub journalled thereon, an assembly of different-sized sprocket wheels slidably mounted on said hub in driving connection therewith, a sleeve slidably mounted against the internal periphery of said hub, a Z-shaped key in a longitudinal slot of said hub, one arm of said key secured to said assembly and the other arm secured to said sleeve, said sleeve having an inturned portion, a collar slidably mounted on said spindle, said collar engaged by said inturned portion, a cross-piece slidably mounted in a longitudinal slot of said spindle and engaging said collar on one face, a compression spring mounted around said spindle and engaging said collar on said other face, and a flexible connection passing through the interior of said spindle to said collar, whereby said collar and with it said sprocket assembly can be positively moved axially against the pressure of said spring relatively to said hub.

VALENTINE PAGE.